Dec. 29, 1964 C. J. TREACY 3,163,758
AUTOMATIC CHARACTER READER UTILIZING INFRARED RADIATION
Filed March 13, 1961
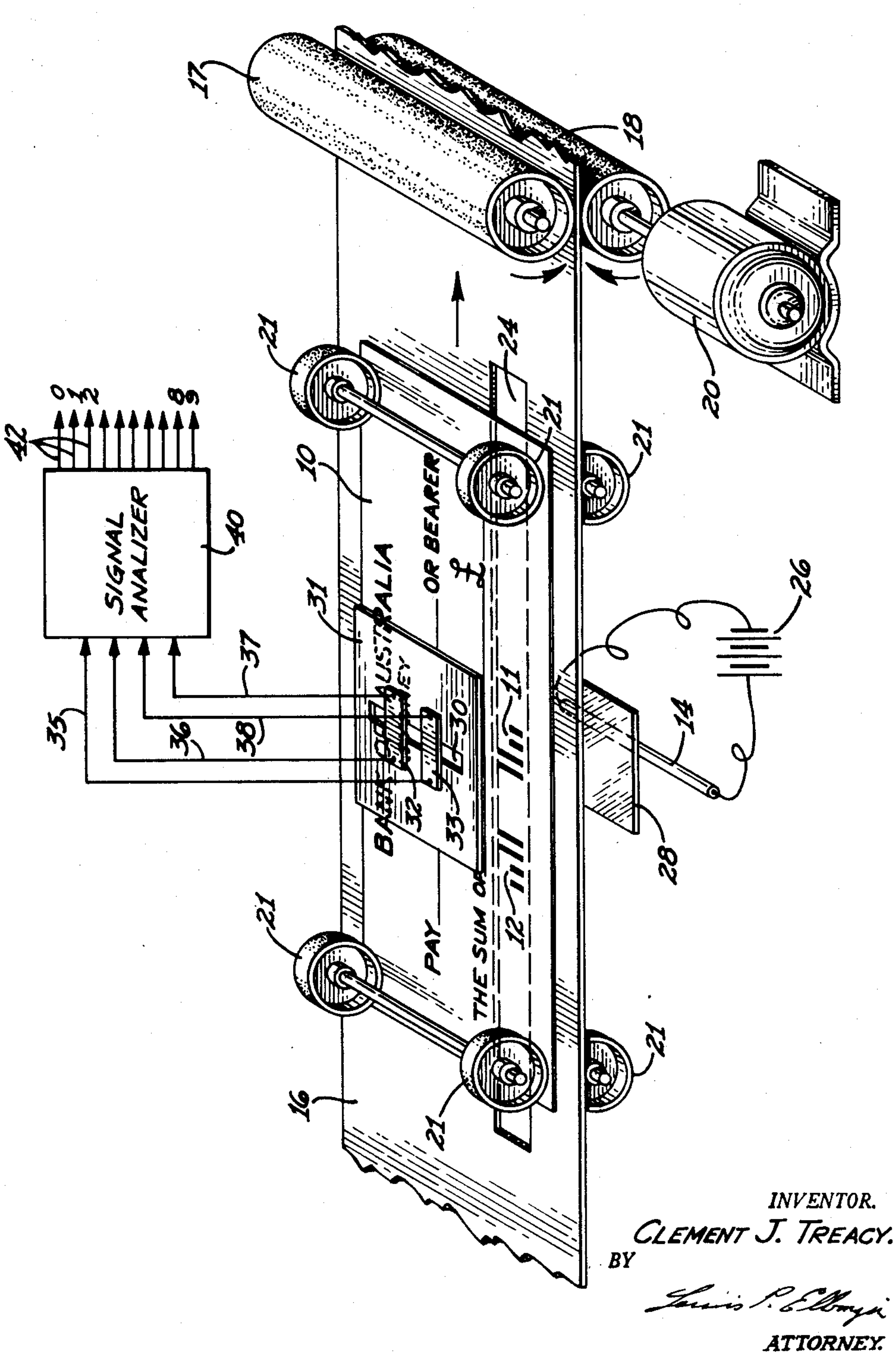
INVENTOR.
CLEMENT J. TREACY.
BY
Louis P. Elbinger
ATTORNEY.

United States Patent Office 3,163,758
Patented Dec. 29, 1964

3,163,758
AUTOMATIC CHARACTER READER UTILIZING INFRARED RADIATION

Clement J. Treacy, Balgowlah, New South Wales, Australia, assignor to General Electric Company, a corporation of New York Filed Mar. 13, 1961, Ser. No. 95,408
8 Claims. (Cl. 250—83.3)

This invention relates to apparatus for automatically sensing or "reading" data borne on documents and, in particular, relates to apparatus for automatically reading documents, even though the document has been over-stamped or over-written with colored writing or stamping inks.

According to presently known methods of providing automatic optical reading of data on bank checks, or other paper or cardboard documents, a visible light beam is directed onto the data characters of the document, such characters being, for example, numerals or letters of the alphabet. The portion of the light beam reflected from the document is passed through an optical scanning system and directed onto photoelectric devices to produce varying electrical signals representing the quantity of light in the reflected beam. These varying electrical signals, which are characteristic of the data characters, are then analyzed automatically to identify the characters scanned. Systems of this type, however, suffer the serious disadvantage that if the data is over-stamped or over-written with commonly used colored writing or stamping inks or over-written with colored pencils, as so often happens to checks that are endorsed and transmitted from bank to bank, the characteristic electrical signals are distorted from normal, so that when these signals are automatically analyzed, they cannot be recognized. Therefore, it is desirable to provide an automatic reading apparatus whereby data printed or written on documents may be automatically read even though the data has been defaced by colored over-stamping or over-writing.

Therefore, it is the principal object of this invention to provide improved automatic reading apparatus.

Another object of this invention is to provide apparatus for automatically reading data characters that are defaced.

Another object of this invention is to provide means for the automatic optical recognition of characters borne on a document, even though such characters are defaced.

Another object of the present invention is to provide means for automatically reading characters that are defaced by over-stamping or over-writing with colored inks or other colored marks.

The foregoing objects are achieved by providing an automatic reading system wherein data is written on a document in black ink and wherein infrared radiation is employed for irradiating such data. Briefly, according to one embodiment of the invention, a source of infrared radiation is positioned opposite one side of the document so as to direct a beam of infrared radiation onto the document in the region wherein the data characters are imprinted. An infrared detector is disposed on the other side of the document to intercept the infrared radiation transmitted through the document. The document is adapted to be moved with respect to the infrared source and detector combination, in order that the characters imprinted on the document are sensed in succession. The resulting electrical signals delivered by the detector are characteristic respectively of each character passing through the infrared beam. These electrical signals are delivered to a signal analyzer, which analyzes the electrical signals and therefrom identifies the character scanned by the beam, and which delivers an output signal identifying the character scanned.

The invention will be described with reference to the accompanying drawing, which is a schematic diagram of one embodiment of the invention.

One type of document that is adapted to have the data thereon recognized by the apparatus of the instant invention, is shown in the figure. Document 10 is a bank check, bearing thereon in a bar code, the characters to be automatically recognized. These characters are imprinted in black ink, such as common black printer's ink, or India ink. In the instant example, each character comprises a group of four closely spaced vertical black bars, wherein the disposition and number of long and short bars identifies the character represented. For example, character 11 may be employed to represent the numeral "8," and character 12 may be employed to represent the numeral "1." Other organizations or distribution of codes may be employed to represent characters. Additionally, the characters may be imprinted in human language, employing numerals or letters of the alphabet directly recognizable to the human eye, provided they are written in black ink, as described heretofore.

The black characters are sensed successively as document 10 is moved past a source 14 of infrared radiation disposed opposite the reverse side of the document. One form of apparatus suitable for providing relative motion between document 10 and infrared source 14 is shown in the figure. The document is carried on a conveyor belt 16 so that each of the characters on the document is successively passed above the infrared source 14. A pair of driver feed rollers 17 and 18 engage the surface of belt 16 and drive the belt to the right. The lower feed roller 18 is driven, in turn, by a drive motor 20. Idler feed rollers 21 hold document 10 closely adjacent belt 16 as the document passes above infrared source 14. An elongated aperture 24 in belt 16 is disposed under the portion of the document bearing the characters to be automatically read, permitting infrared radiation to pass through the belt and the document portion bearing such characters.

Source 14 may be any source of infrared radiation well known in the art, such as a fine drawn nickel-chrome wire heated to the proper temperature by passage of electric current therethrough. A source of electric potential 26 is connected for delivering the current required to heat source 14 to the proper temperature for maximum emission of infrared radiation. Other sources of infrared radiation may be employed, such as tungsten-filament lamps, or other types of arc lamps having strong emission in the infrared portion of the spectrum.

Inasmuch as many available sources of infrared radiation also emit a considerable quantity of visible radiation, it is desirable to prevent all radiation but the infrared from impinging on the document. For this reason a filter 28 is disposed between infrared source 14 and document 10. A suitable filter for limiting the radiation passing therethrough to the infrared portion of the spectrum is known in the art, and may comprise, for example, a thin sheet of ebonite. However, many other infrared filters are available commercially.

The path of the infrared radiation will now be described. The infrared beam of radiation emitted by source 14 passes through filter 28 and is directed onto the portion of document 10 bearing the characters to be recognized. Some of the infrared beam penetrates through the material of the document and passes through a thin slit 30 in a mask 31. Slit 30 is oriented transversely to the direction of motion of the document and is normally of length equal to or greater than the height of the characters to be recognized. Thus, slit 30 passes the infrared radiation transmitted through the area of document 10 immediately under the slit. A pair of infrared detectors 32 and 33 are positioned above mask 31 and facing slit 30.

Infrared detectors 32 and 33 comprise a pair of photoelectric devices sensitive to infrared radiation. Such devices are well known in the art. Each of detectors 32 and 33 produce an electrical signal corresponding to the intensity of the infrared radiation falling thereon. These electrical signals are transmitted over leads 35, 36, 37, and 38 to a signal analyzer 40. Signal analyzer 40 analyzes the signals received from detectors 32 and 33, and since these signals are characteristic of the character being sensed, an output pulse or signal is provided on the one of ouptut leads 42 corresponding to the character sensed. Thus, when character 11 has been scanned and the characteristic electrical signals thereof transmitted from detectors 32 and 33 to analyzer 40, an output pulse is provided on the "8" lead 42. Similarly, when character 12 is sensed, an output pulse is provided on the "1" lead 42.

The infrared detectors 32 and 33 are so positioned with respect to slit 30 and document 10, that all printed bars of the characters on the document will cast deep shadows on one or both of detectors 32 and 33 as the document passes between source 14 and the detectors. Each such shadow cast on the detector results in a sharp decrease in the corresponding signal transmitted to signal analyzer 40. Both short and long character bars will cast a corresponding shadow on detector 33, whereas only the long bars of the characters cast shadows on detector 32. Therefore, signal analyzer 40 receives a single, sharp, negative pulse from detector 33 when a short bar is sensed and sharp, negative pulses from both detectors 32 and 33 when a long bar is sensed. By counting the number of long and short bars and their relative positions in a character, analyzer 40 is able to recognize the particular character sensed and to deliver a pulse on the corresponding one of output leads 42 identifying the character sensed. Apparatus, such as analyzer 40, for recognizing characters by electrical pulse trains derived from the characters are well known in the art.

It is an important feature in the embodiment of the present invention that the characters to be automatically read should be printed or written in ink absorbent to infrared radiation, such as common black printer's ink or black India ink. The ink should be sufficiently black to absorb infrared radiation to an extent that the infrared detecting devices are able to discriminate clearly between ordinary inks and those used for imprinting or writing the characters to be recognized. In this manner, the infrared radiation passes through thin layers of ordinary ink, colored inks, or pencil markings on the documents, whereas most of the infrared radiation is absorbed by the ink of the characters to be identified. Thus, these black ink characters cast relatively deep shadows in contrast to colored inks or colored pencil marks so that as the document is optically scanned, the presence and shape of the deep shadows are readily detected by the infrared detectors, even though the characters may be over-stamped, overprinted, or over-written with commonly used colored writing or stamping inks.

The scope of the invention is not to be construed as limited to the particular embodiment shown. For example, the infrared detector may be oriented parallel to slit 30 and thereby be responsive to the height of the shadow cast by the character. With a detector so oriented a signal analyzer employing correlation techniques may be employed, such as that described by P. E. Merritt and C. M. Steele in U.S. Patent 2,924,812, such patent being assigned to the assignee of the instant invention.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. The combination comprising a document bearing data in the form of characters imprinted with a material absorbent to infrared radiation, a source of predominantly infrared radiation disposed proximate said document for directing a beam of infrared radiation onto said characters, a detector disposed proximate said document and responsive to infrared radiation received therefrom for generating corresponding electrical signals, and means for analyzing said electrical signals to deliver output signals identifying said characters.

2. The combination comprising a document bearing data in the form of characters imprinted with a material absorbent to infrared radiation, a source of predominantly infrared radiation disposed on one side of said document for directing a beam of infrared radiation onto said characters, a detector disposed on the other side of said document in the path of said beam and responsive to infrared radiation received thereby for generating corresponding electrical signals, and means for analyzing said electrical signals to deliver output signals identifying said characters.

3. The combination of claim 2, further including means for providing relative motion between said source and said document whereby said characters on said document successively interrupt said beam.

4. The combination comprising a document bearing data in the form of characters imprinted with black ink, a source of predominantly infrared radiation disposed on one side of said document for directing a beam of infrared radiation onto said characters, a detector disposed on the other side of said document in the path of said beam and responsive to infrared radiation received thereby for generating corresponding electrical signals, and means for analyzing said electrical signals to deliver output signals identifying said characters.

5. The combination comprising a document pervious to infrared radiation and bearing data in the form of characters imprinted with a material absorbent to infrared radiation, a source of predominantly infrared radiation disposed on one side of said document for directing a beam of infrared radiation onto said characters, a detector disposed on the other side of said document in the path of said beam and responsive to infrared radiation received thereby for generating corresponding electrical signals, means for analyzing said electrical signals to deliver output signals identifying said characters, and means for providing relative motion between said source and said document whereby said characters on said document successively interrupt said beam.

6. The combination comprising a document pervious to infrared radiation and bearing data in the form of characters imprinted with a material impervious to infrared radiation, a source of predominantly infrared radiation disposed on one side of said document for directing a beam of infrared radiation onto said characters, a detector disposed on the other side of said document in the path of said beam and responsive to infrared radiation received thereby for generating corresponding electrical signals, means for analyzing said electrical signals to deliver output signals identifying said characters, and means for providing relative motion between said source and said document whereby said characters on said document successively interrupt said beam.

7. The combination comprising a document bearing data in the form of characters imprinted with a material absorbent to infrared radiation; an infrared source for providing a beam of predominantly infrared radiation; an infrared detector disposed in the path of said beam, said detector being responsive to the intensity of the infrared radiation received thereby for generating corresponding electrical signals; means for disposing said document between said source and said detector, whereby said characters on said document interrupt said beam; and means for analyzing said electrical signals to deliver output signals identifying said characters.

8. The combination of claim 7, further including means for providing relative motion between said source and said document whereby said characters on said document successively interrrupt said beam.

References Cited by the Examiner

UNITED STATES PATENTS

| | | | |
|---|---|---|---|
| 2,742,631 | 4/56 | Rajchman et al. | 250—83.3 X |
| 2,941,187 | 6/60 | Simjian | 250—219.11 X |
| 2,975,282 | 3/61 | Schaffer | 250—83.3 X |
| 2,975,966 | 3/61 | Howard | 250—71 X |
| 3,043,956 | 7/62 | Cohen | 250—83.3 |

RALPH G. NILSON, *Primary Examiner.*

ARCHIE R. BORCHELT, *Examiner.*